United States Patent [19]

Lackinger

[11] 4,376,873
[45] Mar. 15, 1983

[54] CABLE GLAND FOR USE WITH UNARMORED ELECTRICAL CABLES

[76] Inventor: Franz Lackinger, 9 Sligo Rd., Kenmare Krugersdorp, Transvaal Province, South Africa

[21] Appl. No.: 261,607

[22] Filed: May 7, 1981

[51] Int. Cl.³ .............................................. H05K 5/02
[52] U.S. Cl. ................................. 174/65 SS; 285/354
[58] Field of Search ................ 174/65 SS; 285/353, 285/354, 356, 357, 343; 277/110, 112

[56] References Cited

U.S. PATENT DOCUMENTS 1,995,479  3/1935  Leins ................................. 277/112
3,667,783  6/1972  Sotolongo ...................... 174/65 SS X
3,986,730  10/1976  Martelli et al. ................ 285/354 X Primary Examiner—A. T. Grimley
Assistant Examiner—D. A. Tone
Attorney, Agent, or Firm—Stevens, Davis, Miller & Mosher

[57] ABSTRACT

A flame-proof cable gland for use with an unarmored electrical cable having a sheath providing a tensile strength and wherein a flame-proofing seal and a clamping ring are provided for co-operation with the outer surface of an electrical cable passing therethrough. The hardnesses of the flame-proofing seal and the clamping ring are selected so that, upon axial compression of both of them to cause them to bulge into contact with the outer sheath of an electrical cable, the flame-proofing seal is rendered operative first followed by the clamping ring.

14 Claims, 4 Drawing Figures

CABLE GLAND FOR USE WITH UNARMORED ELECTRICAL CABLES

This invention relates to a cable gland which is particularly designed for use with unarmoured electrical cables and, more particularly, the invention is concerned with the provision of a flame-proof cable gland for effectively sealing a cable to a wall of an electrical junction box or the like where it passes therethrough.

Elastomeric grommets and other sealant members and materials are generally employed in order to seal effectively an unarmoured cable to a wall of an electrical junction box or the like where it passes therethrough.

However, although such arrangements may be satisfactory for the most part, they generally do not hold an electrical cable against axial movement to any degree of certainty and thus cannot be properly termed flame-proof. While they may be flame-proof in their original condition, it may occur that the cable will move axially where it passes through a wall of an electrical junction box and this can cause the seal to deteriorate or become ineffective. Also an axial force on such an unarmoured electrical cable where longitudinal movement thereof can take place can lead to electrical terminals or connections becoming loosened or in fact broken as a result of axial movement of the cables.

It is the object of this invention to provide a cable gland which can be effectively employed to provide a flame-proof entrance for an unarmoured cable to an electrical connection box or the like and wherein axial movement of such a cable is, at least to a large extent, inhibited or prevented.

In accordance with this invention there is provided a cable gland comprising a pair of tubular body members defining a passage for an electrical cable therethrough, a portion of said passageway having an enlarged internal diameter and receiving within said portion at least one tubular flame-proofing seal adapted to be compressed axially by relative movement between the two body members to cause the seal to be urged inwardly into firm contact with the outer sheath of a cable passing therethrough in use, and a deformable clamping ring also located within said portion of the passage and adapted likewise to be compressed axially to cause it to clamp radially inwardly onto the outer sheath of an electrical cable passing therethrough, the cable gland being characterized in that the tubular flame-proofing seal is appreciably softer than the clamping ring to ensure effective flame-proofing of the gland prior to functioning of the clamping ring upon movement of the two body parts towards each other to shorten the effective length of the said enlarged portion of the passage therethrough.

Further features of the invention provide for the two body parts to be moveable axially by co-operating screw threads thereon; for an intermediate axially moveable member to be located within the body and positioned between the flame-proofing seal and the clamping ring; for the clamping ring to co-operate with a zone of decreasing radius at one end of the part of the passage in which the clamping ring is located, said zone of decreasing radius serving to wedge the clamping ring firmly against the outer sheath of a cable in use; and for the clamping ring to be located on the outer side of the cable gland relative to its means for attachment thereof to an electrical connection box or the like.

Preferably the cable gland embodies said intermediate member and such intermediate member can have a tubular portion of reduced external diameter adapted to urge the tubular flame-proofing seal axially within its location in the passageway and for an enlarged region of the opposite end of said intermediate member to provide said zone of decreasing radius in the form of a truncated conical shaped surface co-operating with the clamping ring. The end of the cable gland which is to be attached to an electrical connection box or the like will generally have an externally screw threaded spigot portion for passage through a hole punched in such a connection box and with which nuts can co-operate to firmly secure the cable gland to an electrical connection box with any required flame-proofing or other seals positioned between the adjacent metal parts.

In its most preferred form the tubular portion of the intermediate member and which is of reduced diameter has an outwardly directed formation at its end adjacent the flame-proofing seal and this formation, which conveniently takes the form of a flange, co-operates with a spring clip located partially in a groove in the one body member to locate the intermediate member captive relative to said body member. The formation conveniently has a lead-in tapered surface for allowing introduction thereof past the spring clip and wherein the inclined surface operates to flex the spring clip radially outwardly to allow passage of the formation therepast but the formation has a planar surface for co-operation with the spring clip on its opposite side so that removal of the intermediate member is prevented thereby. In this manner a simple two part assembly is provided and the simple relative rotation of the two parts to a desired extent brings both the tubular flame-proofing seal and the clamping ring into operative engagement with the outer sheath of an electrical cable passing therethrough.

Clearly the invention is not confined strictly to unarmoured cables but also to lengths of armoured cables which have had the armouring removed therefrom and thereby such sections of cables are in effect unarmoured.

In order that the invention may be more fully understood one embodiment thereof will now be described with reference to the accompanying drawings in which.

Figure 1:
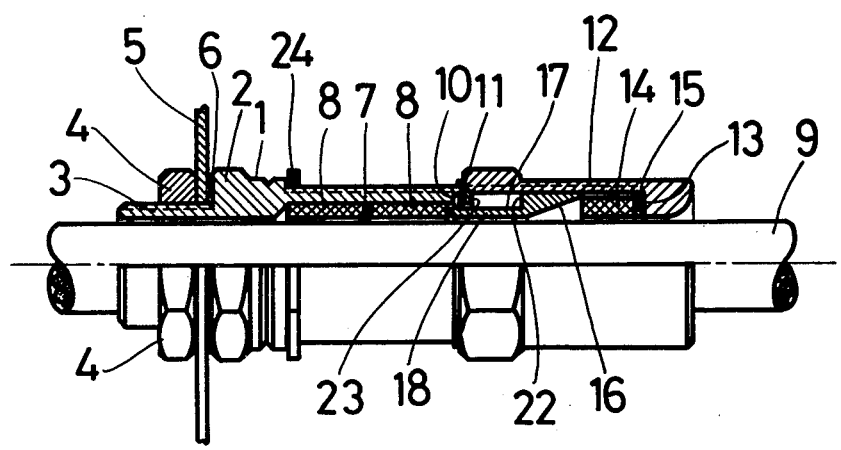
FIG. 1 illustrates, in partly sectioned longitudinal elevation, a cable gland according to this invention in the inoperative position but with a cable passing therethrough.
Figure 2:
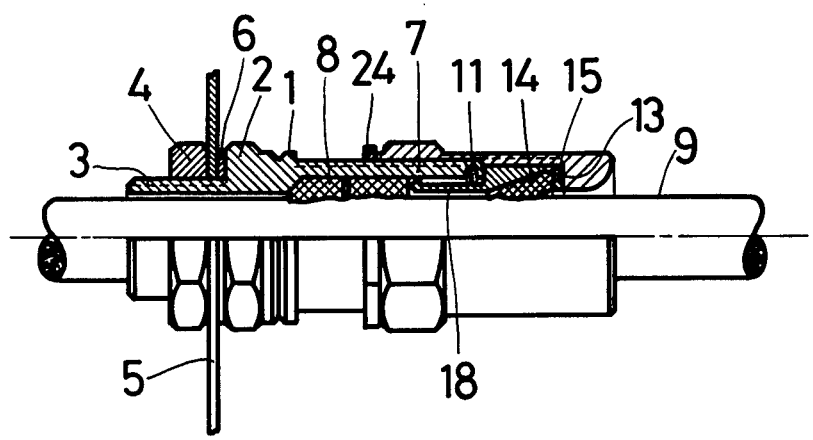
FIG. 2 illustrates the same cable gland but in the operative condition and illustrating the flame-proofing seal and clamping ring in the operative condition.
Figure 3:
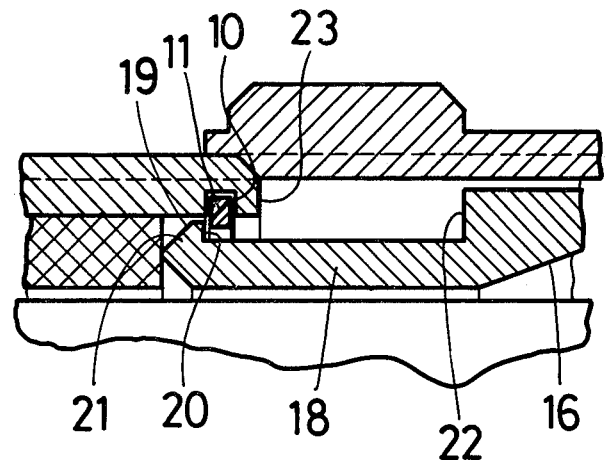
FIG. 3 is a very much enlarged view of a spring clip and co-operating parts of an intermediate member and one body member of the cable gland; and, FIG. 4 illustrates the cable gland in an open condition and with the parts not sectioned.
Figure 4:
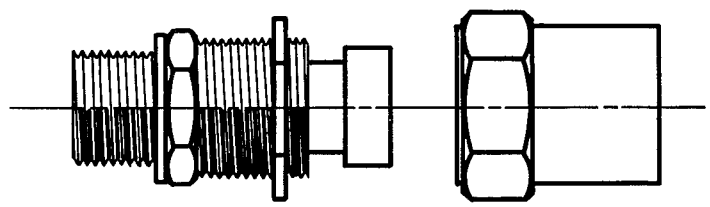

As illustrated, the cable gland in this particular embodiment of the invention comprises a first tubular body member 1 having an external hexagonal nut configuration 2 intermediate its ends and whereby the part can be rotated with the aid of a wrench or the like.

The one end region 3 of the first body part is screw threaded externally so as to co-operate with a nut 4 whereby the gland can be secured to the wall 5 of an electrical junction box. The hexagonal formation is sealed to the external surface of the wall by means of a flame-proof type of sealing washer 6.

The other end region 7 of the first body part is externally screw threaded and has a larger internal bore than the other end region 3 so that two or more tubular elastomeric flame-proof seals 8 can be located between the inner wall of this section and the outer surface of an electrical cable 9 passing through the gland and into the electrical connection box.

This end region 7 of the first body part is externally screw threaded and has, adjacent its end, an internal groove 10 in its inner surface and in which is accommodated a spring clip 11 which extends, at least over part of its circumferential length, into the bore through the end portion of the first body part.

A second body part 12 which is internally screw threaded over the majority of its length to co-operate with the externally screw threaded end region 7 of the first body part is provided to complete the body. This second body part has an inwardly directed end stop 13 at its end remote from the first body part and houses therein a clamping ring 14 of elastomeric material and which is located between a suitable washer 15 and a truncated conical convergent surface 16 on the adjacent end of an intermediate part 17. The intermediate part 17 has a tubular portion 18 extending towards and having its free end located within the adjacent end portion 7 of the first body part. The free end of this tubular portion 18 has an outwardly directed flange 19 arranged such that the tubular portion is maintained within the end portion 7 of the first body part by co-operation between the spring clip 11 and the flat face 20 of the flange. The end face of the flange is tapered downwardly so as to provide an inclined bevelled surface 21 which can force the spring clip open against its inherent resilience when the tubular portion of the intermediate member is initially introduced into the end portion of the first body part. During this the spring clip is simply forced back against its resilience and snaps back into a relaxed condition once the flange has passed the spring clip and groove. At this stage, the spring clip only co-operates with the flat face 20 of the flange and thus the intermediate member cannot be removed from the first body part except with extreme difficulty or with special tools.

This free end of the tubular part of the intermediate member co-operates with the tubular elastomeric flame-proof seals 8 in use so as to compress them axially and cause radial movement of the seals inwardly to bear firmly, and in flame-proof manner, against the outer sheath of the cable passing therethrough.

A shoulder 22 is formed between the conical surface 16 on the intermediate member and the tubular portion thereof and this shoulder is arranged to abut the end surface 23 of the adjacent end portion 7 of the first body member when the seals have been compressed longitudinally to a predetermined and adequate extent.

Only when a predetermined resistance to axial movement of the clamping ring is experienced, and this may be designed to be when the shoulder contacts the end 23 or, alternatively, when sufficient torque is required to rotate the second body part relative to the first body part, is the clamping ring forced into the truncated conical surface so as to be urged radially towards the outer sheath of the cable 9. Further rotation of the two body parts relative to each other causes further movement of the clamping ring into engagement with the outer surface of the cable until, when a predetermined torque is applied between the two body parts, the clamping ring is firmly and sufficiently in contact with the outer surface of the cable. At this stage the clamping ring will actually be "biting" into the outer sheath of the cable and, due to its substantially greater hardness than the flame-proof seals, will adequately locate the cable against axial movement thereof. It will be understood that the invention only applies to cables which have sufficient tensile strength to enable the outer sheath to be clamped in this manner and the types of cables which do not have such adequate strength must be provided for in totally different manner.

It will be understood that after a cable has passed through the passageway in the cable gland the two body parts can be relatively rotated to effectively shorten the length of the portion of enlarged diameter of the passageway through the body and in which the flame-proof seals, intermediate member, and clamping ring are located. Initially the flame-proof seals will engage the outer sheath of the cable and when sufficient resistance to further axial compression is experienced which, as indicated above may take place when the shoulder abuts the end of the first body part, the clamping ring will be urged into the conical shaped surface of the intermediate member and thus clamp the cable sheath firmly relative to the cable gland. A predetermined torque will be required which may be accurately measured or assessed by means of the general dimension of tools conventionally used for tightening such a gland. At such a torque the cable will be firmly anchored against axial movement to a predetermined extent.

A lock nut 24 can be provided on the external screw threaded surface of the first body part in order to lock the second body part relative thereto in the final relative positions of the two body parts.

It will be understood that for the effective operation of the above described cable gland the hardnesses of the flame-proof seals and the clamping ring must be chosen properly. It has been found that effective flame-proof sealing is achieved when an elastomeric seal having a Shore hardness of from 50 to 80 and, preferably, from 55 to 65 is employed and a clamping ring having a Shore hardness of from about 70 to 95 and preferably from 85 to 95 are employed. In either event it is required that the Shore hardness of the flame-proofing seals be appreciably less than that of the clamping ring to ensure that the flame-proofing seal is rendered operative first.

In either event it is preferred that the Shore hardness of the clamping ring be at least 20 greater than that of the flame-proofing seal and preferably about 30.

It will be understood that the general situation is that effective flame-proofing requires a substantially softer elastomeric material which allows the outer sheath to creep when it is placed under a tensile force. It is for this reason that a separate clamping ring is employed which, although it can be of elastomeric material, can be sufficiently hard to effectively eliminate creep as a result of tensile force being applied to the cable at least to a predetermined extent and within certain acceptable limitations. However, such a clamping ring may not have desirable flame-proofing characteristics.

It will be understood that numerous variations may be made to the above described embodiment of the invention without departing from the scope hereof. In particular the conical surface on the intermediate element may be replaced by one on the opposing end of the second body part and, in fact, the entire intermediate member could be absent. In such a case the internal dimensions of the two body parts must be arranged such that effective compression of the flame-proofing seals and the clamping ring can be achieved without the danger that either will not operate effectively.

The invention therefore provides a simple yet effective gland for flame-proofing the positions where cables enter an electrical junction box or the like and wherein the cables themselves have sufficient inherent tensile strength to enable the outer sheath thereof to be employed to resist tearing of the cable out of the cable gland.

What I claim as new and desire to secure by Letters Patent is:

1. An electrical cable gland comprising a pair of tubular body members defining a passage for an electrical cable therethrough, means on one of the body members for connecting the gland to an electrical connection box, a portion of said passageway having an enlarged internal diameter and receiving within said portion at least one tubular flame-proofing seal adapted to be compressed axially by relative movement between the two body members to cause the seal to be urged radially inwardly into firm contact with the outer sheath of a cable passing therethrough in use; a deformable clamping ring also located within said portion of the passage and adapted likewise to be compressed axially to cause it to clamp radially inwardly onto another portion of the outer sheath of an electrical cable passing therethrough, the tubular flame-proofing seal being appreciably softer than the clamping ring to ensure effective flame-proofing of the gland prior to function of the clamping ring upon movement of the two body parts towards each other to shorten the effective length of the said enlarged portion of the passage therethrough, and an intermediate axially movable member located between the flame-proofing seal and clamping ring, the intermediate member being held captive by, but rotatable relative to, one of the body members.

2. A cable gland as claimed in claim 1 in which the two body members are moveable axially by means of co-operating screw threads thereon.

3. A cable gland as claimed in claim 1 in which the clamping ring is in co-operating relationship relative to a zone of decreasing radius at the co-operating end of the intermediate, axially movable member.

4. A cable gland as claimed in claim 1 in which the clamping ring is located adjacent the end of the flame-proofing seal and spaced from the means for connecting the gland to an electrical connection box.

5. A cable gland as claimed in claim 1 in which the axially movable intermediate member has a tubular portion of reduced external diameter adapted to urge the tubular flame-proofing seal axially within its location in the passageway.

6. A cable gland as claimed in claim 5 in which the intermediate member has an enlarged region at its end remote from the flame-proofing seal and said enlarged region has a zone of decreasing radius for receiving the clamping ring in use and urging it into firm contact with the sheath of an electrical cable passing through the gland.

7. A cable gland as claimed in claim 5 in which the tubular portion of reduced diameter has an outwardly directed formation co-operating with a spring clip projecting from a groove in the inner surface of the one body member to retain the intermediate member captive relative to said body member.

8. A cable gland as claimed in claim 7 in which the formation is shaped to urge the spring clip outwardly against its natural resilience upon initial introduction thereof past the spring clip.

9. A cable gland as claimed in claim 1 in which the Shore hardness of the flame-proofing seals is at least 20 degrees less than that of the clamping ring.

10. A cable gland as claimed in claim 9 in which the Shore hardness of the flame-proofing seals is about 30 degrees less than that of the clamping ring.

11. A cable gland as claimed in claim 1 in which the Shore hardness of the flame-proofing seals is from 50 to 80.

12. A cable gland as claimed in claim 11 in which the Shore hardness of the flame-proofing seals is from 55 to 65.

13. A cable gland as claimed in claim 12 in which the Shore hardness of the clamping ring is from 85 to 95.

14. A cable gland as claimed in claim 11 in which the Shore hardness of the clamping ring is from 70 to 95.

* * * * *